United States Patent [19]

Hayakawa et al.

[11] Patent Number: 5,938,762
[45] Date of Patent: *Aug. 17, 1999

[54] METHOD AND APPARATUS FOR PERFORMING EXCEPTION PROCESSING ROUTINE IN PIPELINE PROCESSING

[75] Inventors: Hiroshi Hayakawa, Nagoya; Harutsugu Fukumoto, Anjo; Hiroaki Tanaka, Okazaki, all of Japan

[73] Assignee: Denso Corporation, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,753

[22] Filed: Oct. 7, 1996

[30] Foreign Application Priority Data

Oct. 6, 1995 [JP] Japan .................................. 7-260411
Oct. 6, 1995 [JP] Japan .................................. 7-260413

[51] Int. Cl.⁶ .............................. G06F 9/38; G06F 9/46
[52] U.S. Cl. ...................... 712/244; 712/220; 712/236; 712/245
[58] Field of Search ..................... 395/390–391, 395/561, 568, 580–581, 583, 591, 595, 733, 800.32, 739, 800.4, 800.41

[56] References Cited

U.S. PATENT DOCUMENTS

| | | | |
|---|---|---|---|
| 5,193,156 | 3/1993 | Yoshida et al. | 395/586 |
| 5,297,263 | 3/1994 | Ohtsuka et al. | 395/591 |
| 5,386,563 | 1/1995 | Thomas | 395/591 |
| 5,390,305 | 2/1995 | Takahashi et al. | 395/591 |
| 5,590,294 | 12/1996 | Mirapuri et al. | 395/591 |
| 5,615,349 | 3/1997 | Matsuo et al. | 395/388 |

FOREIGN PATENT DOCUMENTS 3-176741  7/1991  Japan .................. G06F 9/46

OTHER PUBLICATIONS

BABA: "Computer Architecture", Jun. 24, 1996 (see English translation and specification p. 5).

Hardware Manual for Hitachi Single Chip RISC Micro Computer, SH7032, SH7034, HD6417032, HD6477034, and HD6437034 published in Mar, 1993 (see English translation).

Programming Manual for Hitachi Single Chip RISC Micro Computer SD7000 Series, published in Sep. 1993 (see English abstract).

Hardware Manual (HD6417604) for Super H RISC engine SH7604, published by Hitachi (see English abstract).

Primary Examiner—Krisna Lim
Assistant Examiner—Bharat Barot
Attorney, Agent, or Firm—Pillsbury Madison & Sutro LLP

[57] ABSTRACT

An information processing apparatus and method, such that when an interruption occurs in a microprocessor, an exception processing sequence control is started, a program condition of an interrupted program and an address of the interrupted program are saved in a RAM, a program address of a jump instruction is read out from an exception processing generating source and is set in a program counter, and the exception processing sequence control is stopped. Thereafter, a normal processing sequence control is started, the jump instruction is read out from a ROM, an address of an exception processing vector is calculated according to the jump instruction, the exception processing vector is read out from the ROM, a branch address of an exception processing routine indicated by the exception processing vector is set in the program counter, and an operation state of the microprocessor is branched to the exception processing routine. Thereafter, the normal processing sequence control is stopped, and the exception processing routine is performed in the exception processing sequence control.

10 Claims, 10 Drawing Sheets

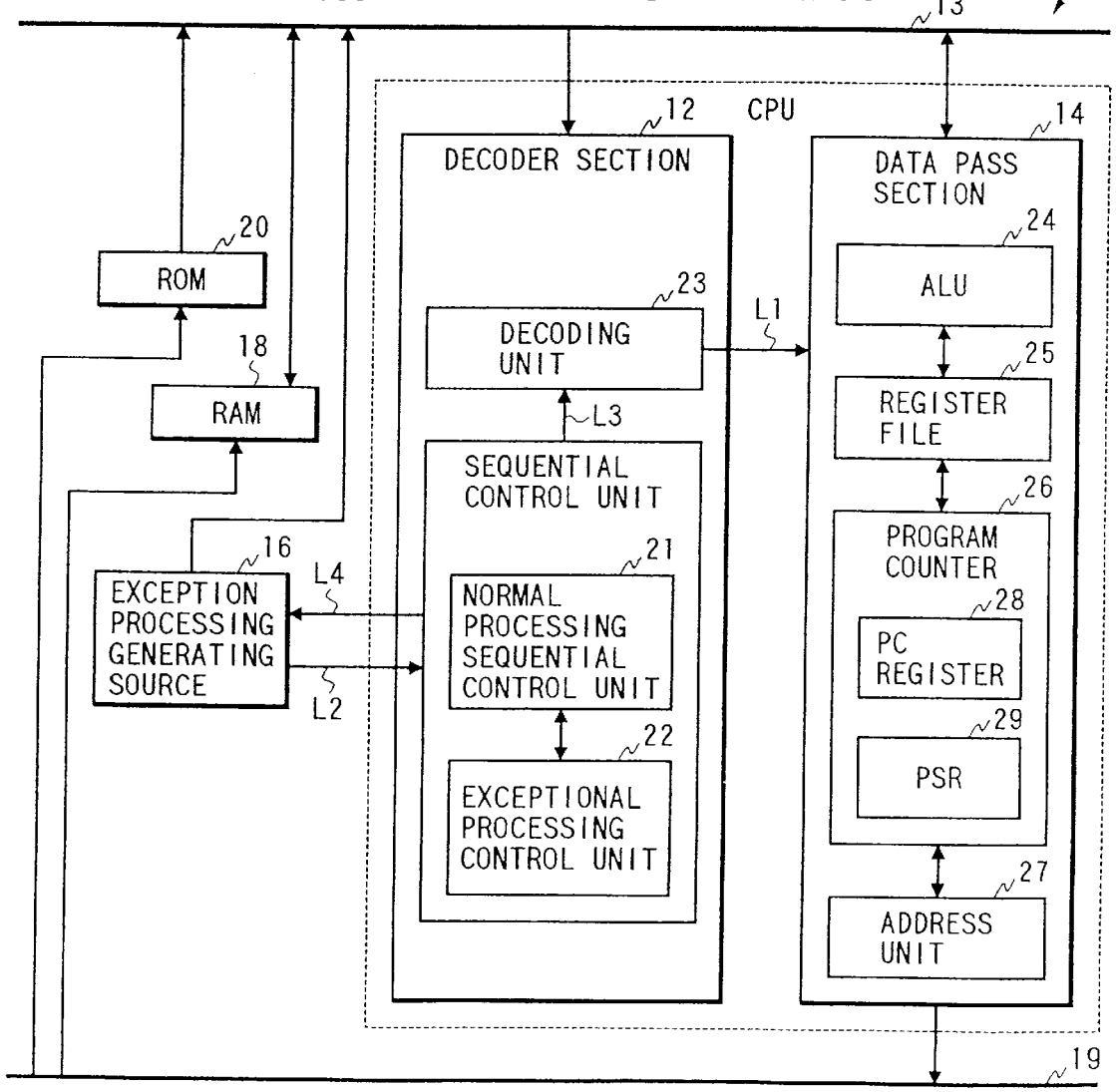

METHOD AND APPARATUS FOR PERFORMING EXCEPTION PROCESSING ROUTINE IN PIPELINE PROCESSING

BACKGROUND OF THE INVENTION

1. Field of the Invention

The present invention relates to an exception processing method for processing an interruption at a high speed and an information processing apparatus in which an exception processing control unit used for performing the exceptional processing method is downsized.

2. Description of the Related Art

An arithmetic function is generally classified into five stages of an instruction reading operation (IF), an instruction decoding operation (ID), an arithmetic operation (EX), a memory accessing operation (MA) and a write-back operation (WB). A microprocessor (or an information processing apparatus,) in which pipe line processing is performed by executing the five stages in parallel, is well known. A stream of a general five-stage pipeline is shown in FIG. 1.

2.1. Previously Proposed Art

FIG. 2 is a block diagram of a conventional microprocessor. As shown in FIG. 2, a conventional micro processor 11 is composed of a decoder section 12 for reading an instruction transmitted through a data bus 13 and decoding the instruction, a data pass section 14 for performing an arithmetic operation, a logical operation and a shift operation for data transmitted through a register file under an control of the instruction transmitted from the decoder section 12 through a control bus L1, an exception processing generating source 16 for generating an interruption occurring signal at a time of an interruption occurrence and transmitting the interruption occurring signal to the decoder section 12 through an interruption occurring signal line L2, a random access memory (RAM) 18 connected to the data bus 13 and an address bus 19 for temporarily storing data processed in the data pass section 14, and a read only memory (ROM) 20 connected to the data bus 13 and the address bus 19 for storing pieces of data and instructions transmitted to the decoder section 12 and the data pass section 14. A central processing unit (CPU) is composed of the decoder section 12 and the data pass section 14.

The decoder section 12 is composed of a normal processing sequential control unit 21 for controlling a normal processing routine performed according to a normal processing program stored in the ROM 20, an exception processing sequential control unit 22 for controlling an exception processing routine performed according to an exception processing program stored in the ROM 20 in cases where the interruption occurring signal generated in the exception processing generating source 16 is received, and a decoding unit 23 for decoding an instruction transmitted from the ROM 20 according to the normal processing or the exception processing performed by the normal processing sequential control unit 21 or the exception processing sequential control unit 22 when a control signal is transmitted from the normal processing sequential control unit 21 or the exception processing sequential control unit 22 through a control line L3.

The data pass section 14 is composed of an arithmetic logic unit (ALU) 24 for performing a logical operation, an arithmetic operation, a shift operation and the like for the data, a register file 25 for storing an arithmetic result obtained in the ALU 24, a program counter 26 for counting an address of a program currently used, and an address unit 27 for selecting an output of an operation result obtained in the ALU 24 to the address bus 19 or an output from the program counter 26 to the address bus 19.

The program counter 26 has a 32-bit program counter (PC) register 28 and a 32-bit processor state register (PSR) 29.

In the IF stage, the program counter 26 is operated. In the ID stage, the decoder section 12 and the register file 25 are operated. In the EX stage, the ALU 24 is operated. In the MA stage, the address unit 27 is operated, In the WB stage, the register file 25 is operated.

In the above configuration of the conventional microprocessor 11, when an operational state of the microprocessor 11 is changed from a normal processing state to an exception processing state because of the occurrence of an interruption, saving of a condition of an interrupted program (a first operation) and a branching operation to an exception processing routine placed at a branch address (a second operation) are performed in the conventional microprocessor 11.

The condition of the interrupted program in the first operation denotes an interrupted instruction of the program stored in a condition register and an address of the interrupted instruction, and the program condition is saved in the RAM 18 or an internal register (not shown) of the microprocessor 11.

The setting of the branch address is performed according to one of two methods in the second operation. One method is a vector interrupting method in which an address relating to the branch address is transmitted from the exception processing generating source 16 to the exception processing sequential control unit 22. The other method is a non-vector interrupting method in which branching information including the branch address is stored in the ROM 20 in advance and the branch address is transmitted from the ROM 20 to the exception processing sequential control unit 22.

The vector interrupting method is classified into a memory direct addressing technique and a memory indirect addressing technique (refer to "Computer Architecture" written by Takanobu BABA and published on Jun. 24, 1996). In the memory direct addressing technique, the branch address is transmitted from the exception processing generating source 16 to the exception processing sequential control unit 22. In the memory indirect addressing technique, the branch address is stored at a reference address of a memory unit represented by the ROM 20, the reference address or a difference (called an offset value) between a base address and the reference address is transmitted from the exception processing generating source 16 to the exception processing sequential control unit 22, and a value of the branch address stored at the reference address of the ROM 20 is transmitted to the exception processing sequential control unit 22.

In a first conventional exception processing method performed according to the memory indirect addressing technique, a state transition of the microprocessor 11 from a normal processing state to an exception processing state is shown in FIG. 3.

When the microprocessor 11 is set in a normal program executing condition to execute a particular normal program (step S210), it is judged whether or not an interruption to the particular normal program occurs (step S220). In cases where an interruption occurs, the occurrence of the interruption is transmitted from the exception processing generating source 16 to the exception processing sequential control unit 22, a program state of the interrupted program registered in a stack of the PSR 29 initially is saved in the RAM 18 (step S230), contents of a stack of the PC register 28 take refuge in the RAM 18 (step S240), an offset value used to specify an exception processing vector is loaded from the exception processing generating source 16 to the exception processing sequential control unit 22 (step S250), an address of the exception processing vector is calculated in the ALU 24 by using the offset value and a base address (step S260), the exception processing vector stored in the ROM 20 is specified according to the address of the exception processing vector transmitted through the address bus 19, the exception processing vector is loaded from the ROM 20 to the data pass section 14 through the data bus 13 (step S270), the exception processing vector is set in the PC register 28 (step S280), and an operational state of the microprocessor 11 is branched to an exception processing routine (step S290). In this case, a data value stored at an address of the ROM 20 which is indicated by a value of the exception processing vector is the branch address, and the branch address denotes an exception processing starting address.

FIG. 4 shows a stream of pipeline processing indicating the above procedure.

As shown in FIG. 4, when an interruption signal Sin is input from the exception processing generating source 16 to the exception processing sequential control unit 22 in an ID stage 401 in which an instruction 400 is executed, the operation of the normal processing sequential control unit 21 is stopped, and the operation of the exception processing sequential control unit 22 is started. That is, a first instruction 400' is output from the exception processing sequential control unit 22 in the ID stage 401 of the instruction 400, a storage address of the RAM 18 for the PSR 29 is calculated in an EX stage of the instruction 400, a program state of the interrupted program registered in a stack of the PSR 29 initially is saved in the RAM 18 in an MA stage 402 of the instruction 400. Also, a second instruction 410 is output from the exception processing sequential control unit 22, a storage address of the RAM 18 for the PC 28 is calculated in an EX stage of the second instruction 410 in synchronization with the MA stage 402, and contents of a stack of the PC register 28 is saved in the RAM 18 in a MA stage 403 of the second instruction 410. Also, a third instruction 420 is output from the exception processing sequential control unit 22, a value of a reference address at which an exception processing vector indicating a branch address is stored in the ROM 20 or an offset value from a base address is calculated in an EX stage of the third instruction 420 in synchronization with the MA stage 403, and the value of the reference address or the offset value is loaded from the exception processing generating source 16 to the exception processing sequential control unit 22 in an MA stage 404 of the third instruction 420. Also, a fourth instruction 430 is output from the exception processing sequential control unit 22, IF and ID stages are performed, and any EX, MA or WB stage is not performed. Also, a fifth instruction 440 is output from the exception processing sequential control unit 22, the value of the reference address is set in the PC register 28 in an EX stage 405 of the fifth instruction 440 in cases where the value of the reference address is loaded in the MA stage 404, a value of a reference address calculated from the offset value and a base address is set in the PC register 28 in the EX stage 405 in cases where the offset value is loaded in the MA stage 404, and the exception processing vector placed at the reference address is loaded from the ROM 20 to the data pass section 14 in an MA stage 406 of the fifth instruction 440. Also, a sixth instruction 450 is output from the exception processing sequential control unit 22, IF and ID stages are performed, and any EX, MA or WB stage is not performed. Also, a seven instruction 460 is output from the exception processing sequential control unit 22, the loaded data (the exception processing vector) is set in the PC register 28 in an EX stage 407 of the seven instruction 460. Also, an eighth instruction 470 is output from the exception processing sequential control unit 22, IF and ID stages are performed, and any EX, MA or WB stage is not performed. That is, the MA stage 402, the MA stage 403, the MA stage 404, the EX stage 405, the MA stage 406 and the EX stage 407 are performed in that order. Thereafter, a ninth instruction 480 is output from the exception processing sequential control unit 22 in synchronization with the EX stage 407, IF and ID stages are performed, and any EX, MA or WB stage is not performed. Thereafter, a tenth instruction 490 is output from the exception processing sequential control unit 22, and an exception processing routine is started. In this case, an interruption response is 10 cycles. Therefore, it is required to decode 9 cycles of the instructions 400' to 480 in the decoding unit 23 under the control of the exception processing sequential control unit 22 for the purpose of performing the control in the EX stage 407.

Also, in a second conventional exception processing method performed according to the memory direct addressing technique, the change of an operational state of the micro processor 11 from a normal processing state to an exception processing state is shown in FIG. 5.

When the microprocessor 11 is set in a normal program executing condition to execute a particular normal program (step S210), it is judged whether or not an interruption to the particular normal program occurs (step S220). In cases where an interruption occurs, the occurrence of the interruption is transmitted from the exception processing generating source 16 to the exception processing sequential control unit 22, a program state of the interrupted program registered in a stack of the PSR 29 initially is saved in the RAM 18 (step S230), contents of a stack of the PC register 28 is saved in the RAM 18 (step S240), an exception processing vector is loaded from the exception processing generating source 16 to the exception processing sequential control unit 22 (step S310), the exception processing vector is set in the PC register 28 (step S320), and an operational state of the microprocessor 11 is branched to an exception processing routine (step S330).

FIG. 6 shows a stream of pipe line processing indicating the above interruption response of the microprocessor 11 to an exceptional processing state.

As shown in FIG. 6, when an interruption signal Sin is input from the exception processing generating source 16 to the exception processing sequential control unit 22 in an ID stage 301 in which an instruction 300 is executed, the operation of the normal processing sequential control unit 21 is stopped, the operation of the exception processing sequential control unit 22 is started, and a plurality of instruction processing cycles in which an EX stage is again executed after three MA stages are executed is performed. That is, a first instruction 300' is output from the exception processing sequential control unit 22 in the ID stage 301 of the instruction 300, a storage address of the RAM 18 for the PSR 29 is calculated in an EX stage of the instruction 300, a program state of the interrupted program registered in a stack of the PSR 29 initially is saved in the RAM 18 in an MA stage 302 of the instruction 300. Also, a second instruction 310 is output from the exception processing sequential control unit 22, a storage address of the RAM 18 for the PC 28 is calculated in an EX stage of the second instruction 310 in synchronization with the MA stage 302, and contents of a stack of the PC register 28 is saved in the RAM 18 in an MA stage 303 of the second instruction 310. Also, a third instruction 320 is output from the exception processing sequential control unit 22, a branch address is calculated in an EX stage of the third instruction 320 in synchronization with the MA stage 303, and the branch address is loaded from the exception processing generating source 16 to the exception processing sequential control unit 22 in an MA stage 304 of the third instruction 320. Also, a fourth instruction 330 is output from the exception processing sequential control unit 22, IF and ID stages are performed, and any EX, MA or WB stage is not performed. Also, a fifth instruction 340 is output from the exception processing sequential control unit 22, and the branch address is set in the PC register 28 in an EX stage 305 of the fifth instruction 340. Also, a sixth instruction 350 is output from the exception processing sequential control unit 22, IF and ID stages are performed, and any EX, MA or WB stage is not performed. Also, a seventh instruction 360 is output from the exception processing sequential control unit 22, IF and ID stages are performed, and any EX, MA or WB stage is not performed.

Thereafter, an instruction 370 is output from the exception processing sequential control unit 22, and an exception processing routine is started. In this case, an interruption response is 7 cycles of the instructions 300', 310, - - -, 350 and 360.

2.2. Problems To Be Solved By The Invention

However, in the first conventional exception processing method according to the memory indirect addressing technique, in cases where an operational state of the micro processor 11 is changed from the normal processing state to the exception processing state, because a save operation of the program state and contents of the program counter and a setting operation for setting the exception processing vector (or the branch address) to the PC register 28 are performed under the control of only the exception processing sequential control unit 22, a size of the exception processing sequential control unit 22 is inevitably enlarged, so that there is a such that the micro processor 11 cannot be downsized.

Also, in the second conventional exception processing method according to the memory direct addressing technique, because the second EX stage is executed after three MA stages are executed, there is a drawback that a response speed in the change of an operational state of the micro processor 11 from the normal processing state to the exception processing state is low.

SUMMARY OF THE INVENTION

A first object of the present invention is to provide, with due consideration to the drawbacks of such a conventional exception processing method and a conventional microprocessor, an exception processing method performed according to the memory indirect addressing technique in an information processing apparatus in which an exception processing sequential control unit is downsized.

A second object of the present invention is to provide an exception processing method performed according to the memory direct addressing technique in which a time for making an interruption response from a normal processing state to an exception processing state is shortened.

The first object is achieved by the provision of an exception processing method according to a memory indirect addressing technique, comprising the steps of:

detecting an occurrence of an interruption for exception processing in an exception processing sequential control unit;

loading a normal instruction from a storing unit under the control of the exception processing sequential control unit;

setting the normal instruction in a program counter under the control of the exception processing sequential control unit; and setting a branch address of an exception processing routine in the program counter according to the normal instruction under the control of a normal processing sequential control unit.

The step of detecting the occurrence of an interruption includes the steps of:

transmitting an address of a normal program currently used to a memory for saving; and transmitting a program state of the normal program to the memory for saving.

The step of setting a branch address comprises the steps of:

executing the normal instruction;

loading a value of a reference address at which the branch address is stored or an address offset value according to the normal instruction;

setting the branch address in the program counter according to the reference address or a set of the address offset and a base address; and starting the exception processing routine under the control of the exception processing sequential control unit.

In the above steps, an interruption for an exception processing occurs, an address of a normal program currently used and a program state of the normal program is saved in the memory, and a normal instruction is loaded from a storing unit and is set in a program counter under the control of the exception processing sequential control unit. Thereafter, the normal instruction is executed, a value of a reference address or an address offset value is loaded according to the normal instruction, and the branch address is set in the program counter according to the reference address or a set of the address offset and a base address under the control of a normal processing sequential control unit. In this case, a jump instruction, a program counter relative branch instruction, a load instruction or a transfer instruction can be used as the normal instruction. In particular, because the jump instruction is provided for various information processing apparatus, the jump instruction an be easily used.

Thereafter, the exception processing routine is started under the control of the exception processing sequential control unit.

Accordingly, because the branching to the exception processing routine is performed under the control of the normal processing sequential control unit by executing the normal instruction, a volume of control required for the exception processing sequential control unit is reduced, so that the exception processing sequential control unit can be made small.

The second object is achieved by the provision of an exception processing method according to a memory direct addressing technique, comprising the steps of:

dividing an operational function performed according to each of a plurality of instructions into a plurality of stages;

executing the plurality of instructions in parallel to each other according to a pipeline processing by simultaneously performing one stage of one instruction and one stage of another instruction;

detecting an occurrence of an interruption for exception processing in an exception processing sequential control unit;

transmitting a program state of a normal program currently used to a refuge memory for saving according to a first instruction under the control of the exception processing sequential control unit;

transmitting an address of the normal program to the memory for saving according to a second instruction under the control of an exception processing sequential control unit;

loading a branch address of an exception processing routine according to a third instruction under the control of the exception processing sequential control unit before the address of the normal program or the program state of the normal program is transmitted to the memory; and setting the loaded branch address in a program counter according to a fourth instruction under the control of the exception processing sequential control unit in synchronization with the transmission of the address of the normal program or the transmission of the program state of the normal program.

Also, the step of transmitting a program state of a normal program is performed in a memory access stage of the first instruction, the step of loading a branch address of an exception processing routine is performed in a memory access stage of the third instruction after the memory access stage of the first instruction, the step of transmitting an address of the normal program is performed in a memory access stage of the second instruction after the memory access stage of the third instruction, and the step of setting the loaded branch address is performed in synchronization with the transmission of the address of the normal program.

In the above steps, a memory access stage is repeated to perform the step of transmitting a program state of a normal program, the step of loading a branch address of an exception processing routine and the step of transmitting an address of the normal program in that order, and the step of setting the loaded branch address is performed in synchronization with the transmission of the address of the normal program. Therefore, because the step of loading a branch address of an exception processing routine is not performed in a final memory access stage among the above three memory access stages, the step of setting the loaded branch address performed in an arithmetic operation (EX) stage can be performed in synchronization with the transmission of the address of the normal program.

Accordingly, because it is not required to additionally prepare one cycle for the arithmetic operation (EX) stage, an amount of time for an interruption response can be shortened by one cycle.

BRIEF DESCRIPTION OF THE DRAWINGS

The objects, features and advantages of the present invention will be apparent from the following description taken in conjunction with the accompanying drawings, in which:

FIG. 1 shows an example of a stream of general five-stage pipeline;

FIG. 2 is a block diagram of a conventional microprocessor;

DETAILED DESCRIPTION OF THE EMBODIMENTS

Preferred embodiments of an exception processing method performed according to the memory indirect addressing technique, an information processing apparatus used to perform the exception processing method, an exception processing method performed according to the memory direct addressing technique, and an information processing apparatus used to perform the exception processing method according to the present invention are described with reference to drawings.

Figure 3:
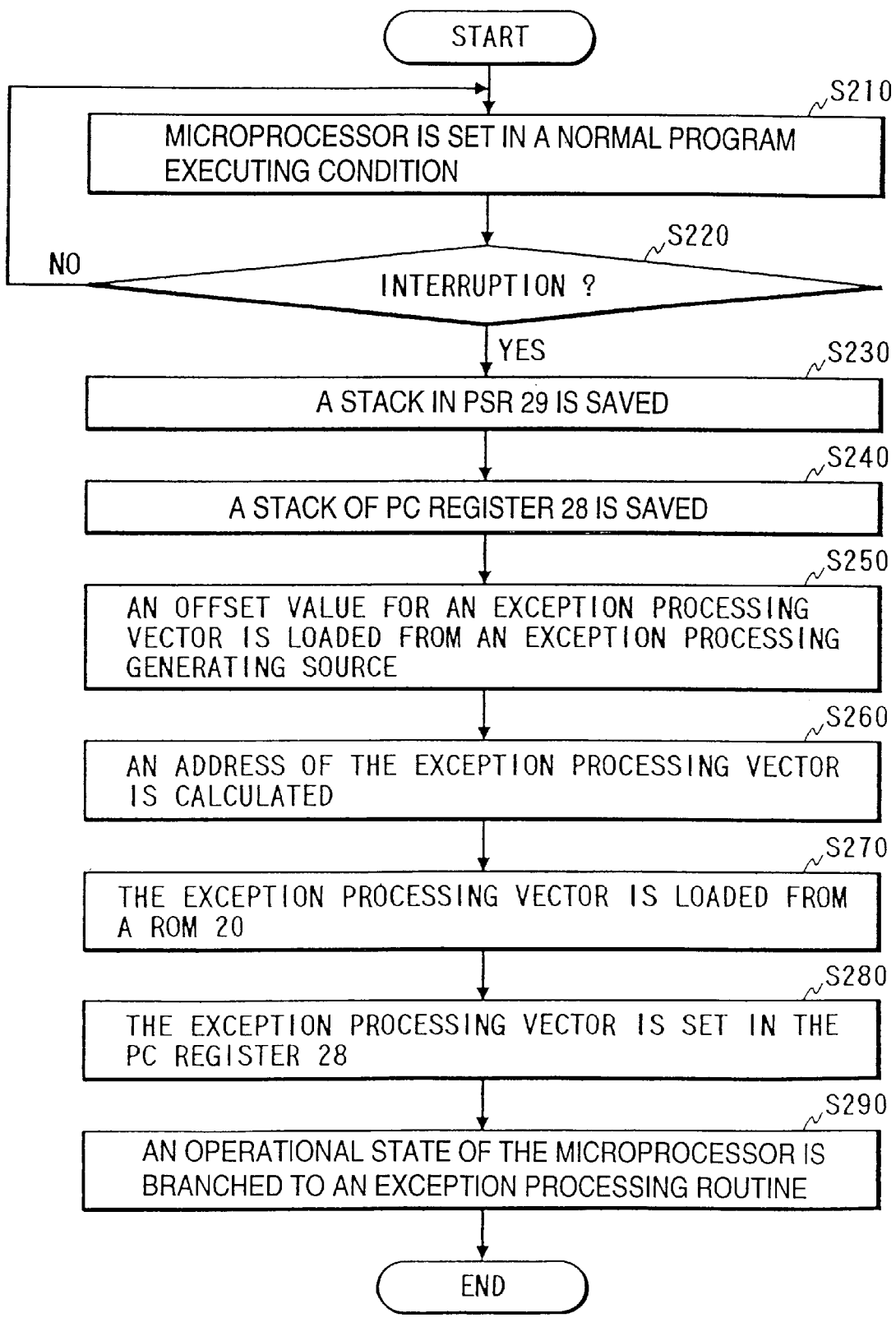
FIG. 3 is a flow chart showing a state transition of the conventional micro processor from a normal processing state to an exception processing state according to a memory indirect addressing technique.
Figure 4:
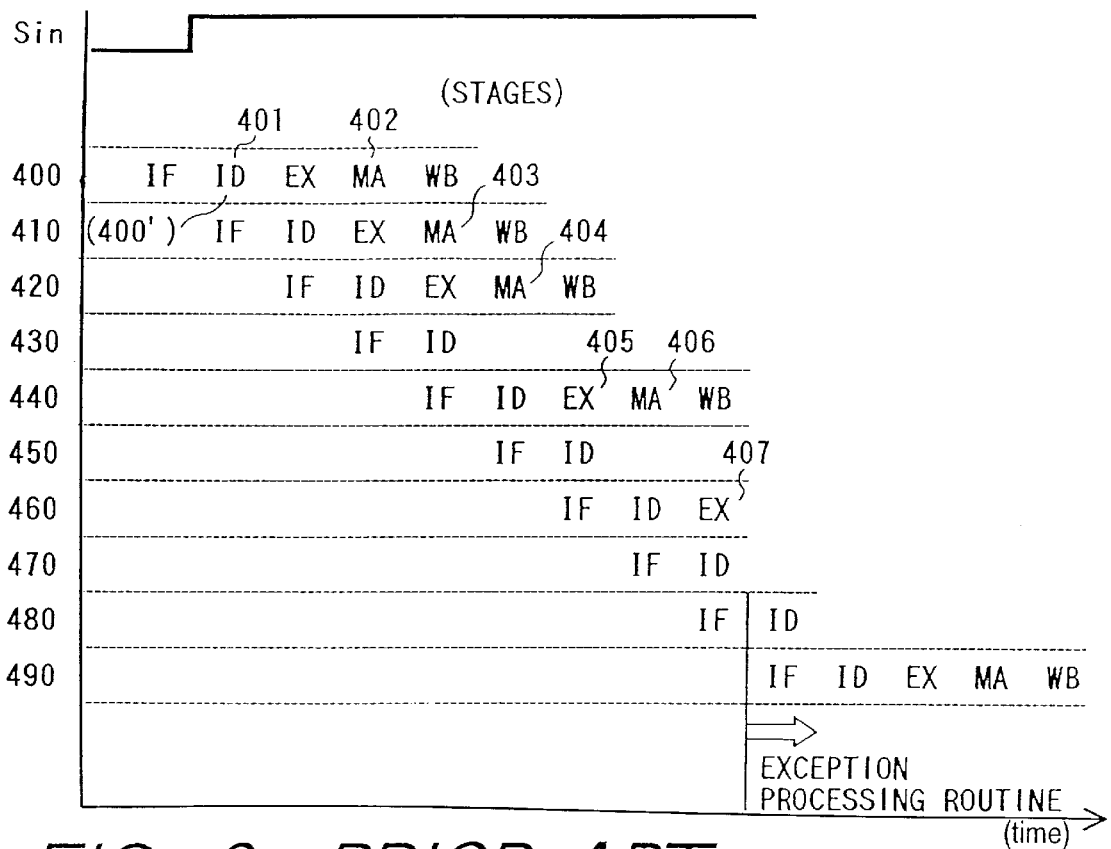
FIG. 4 shows a stream of pipeline processing performed in the conventional microprocessor according to the memory indirect addressing technique when an interruption for an exception processing occurs.
Figure 6:
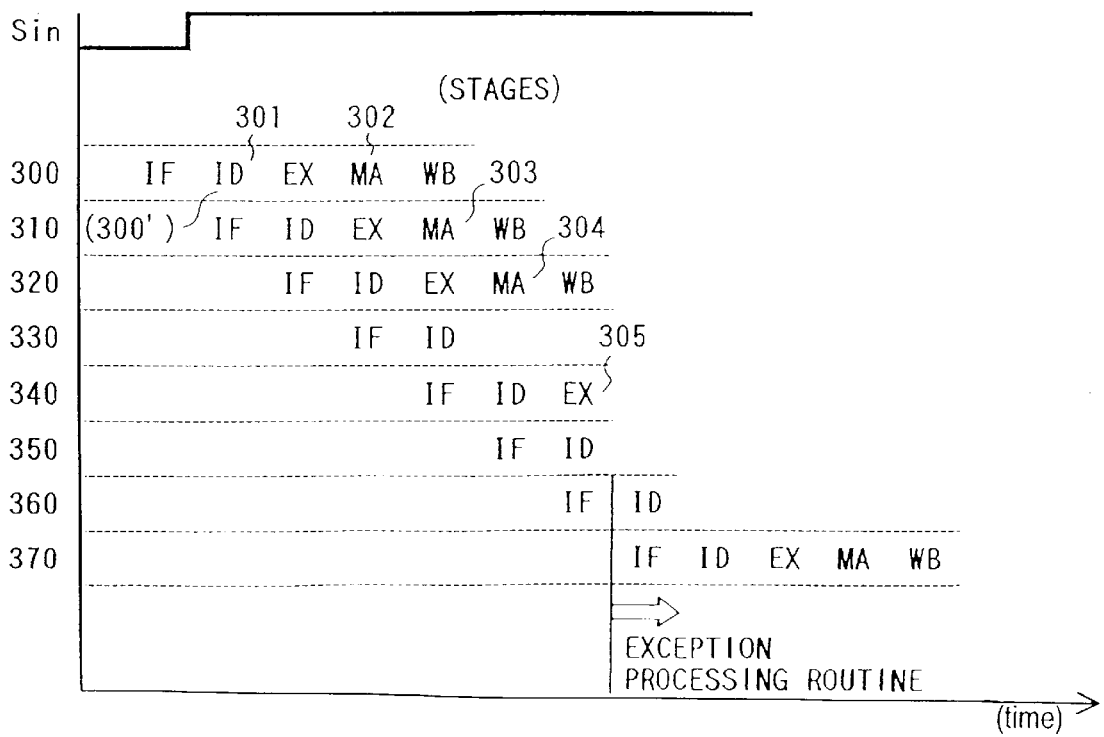
FIG. 6 shows a stream of pipeline processing performed in the conventional microprocessor according to the memory direct addressing technique when an interruption for an exception processing occurs.
Figure 5:
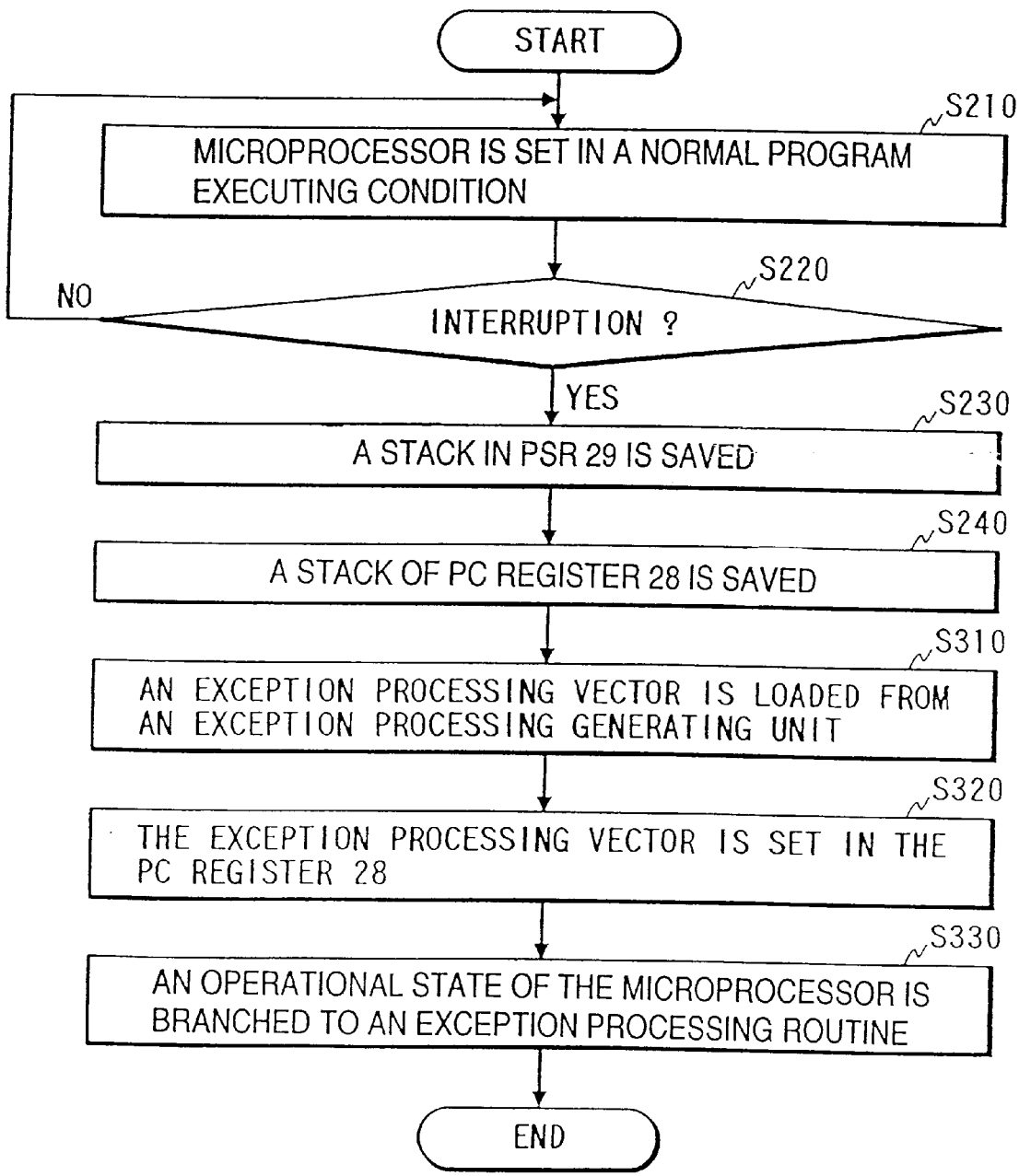
FIG. 5 is a flow chart showing an interruption response of the conventional microprocessor to an exceptional processing state according to a memory direct addressing technique.
Figure 7:
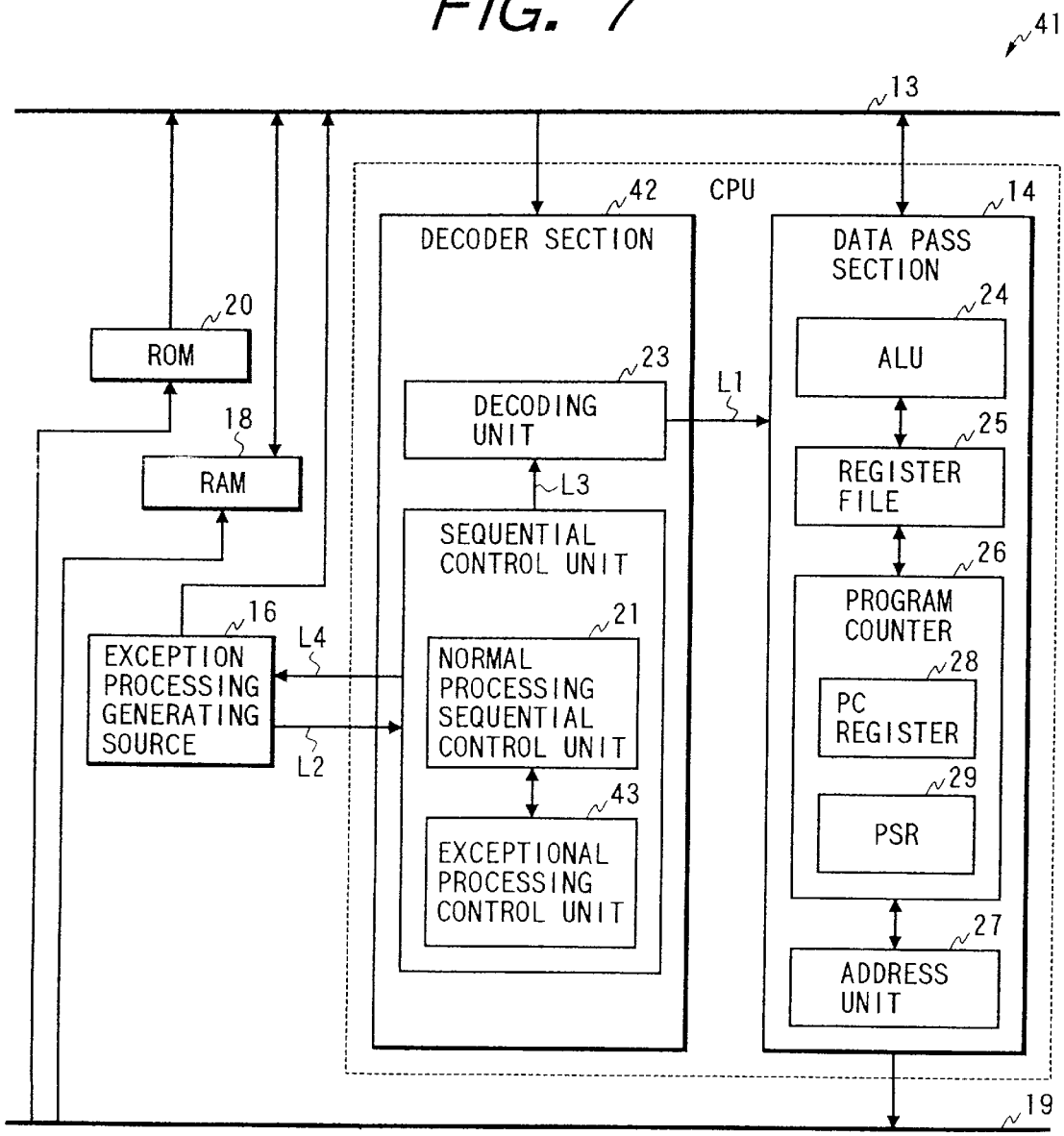
FIG. 7 is a block diagram of an information processing apparatus (or a microprocessor) according to a first embodiment of the present invention.

FIG. 7 is a block diagram of an information processing apparatus (or a microprocessor) according to a first embodiment of the present invention.

As shown in FIG. 7, a microprocessor 41 comprises an exception processing generating source 16, the RAM 18, the ROM 20, the data pass section 14 and a decoder section 42 for reading an instruction transmitted from the ROM 20 through the data bus 13 and decoding the instruction.

The decoder section 42 comprises a normal processing sequential control unit 21, an exception processing sequential control unit 43 for controlling an exception processing routine performed according to an exception processing program stored in the ROM 20 in cases where the interruption occurring signal generated in the exception processing generating source 16 is received, and the decoding unit 23.

Figure 8:
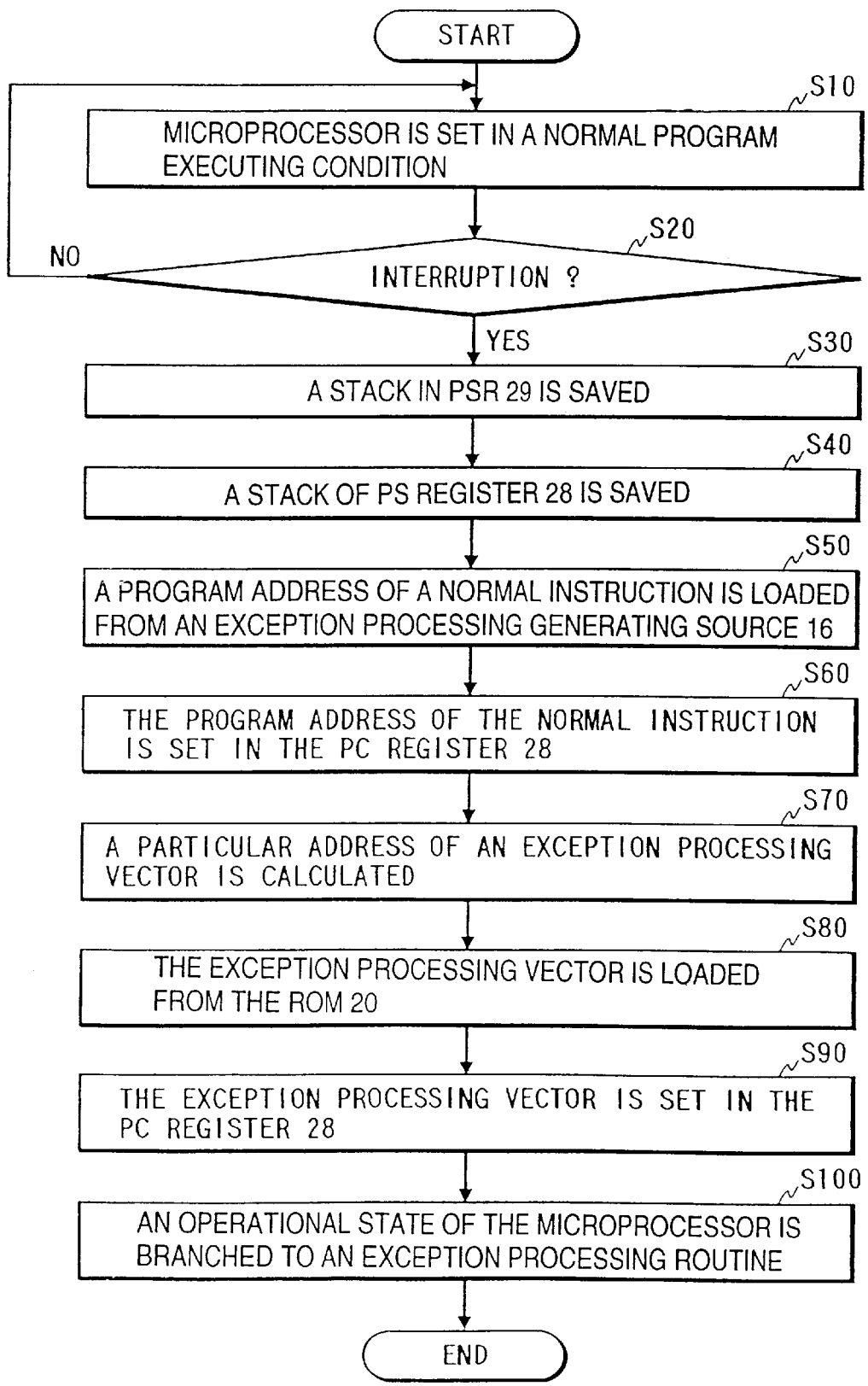
FIG. 8 is a flow chart showing a state transition of the information processing apparatus shown in FIG. 7 from a normal processing state to an exception processing state according to the memory indirect addressing technique.

In the above configuration of the micro processor 41, a state transition of the micro processor 41 from a normal processing state to an exception processing state is described with reference to FIG. 8.

When the micro processor 41 is set in a normal program executing condition to execute a particular normal program (step S10), it is judged whether or not an interruption to the particular normal program for an exceptional processing occurs (step S20). In cases where an interruption occurs, an interruption occurring signal indicating the occurrence of the interruption is transmitted from the exception processing generating source 16 to the exception processing sequential control unit 43, and the operation of the exception processing sequential control unit 43 is started. Therefore, a program state of the interrupted program registered in a stack of the PSR 29 initially is saved in the RAM 18 (step S30), and contents of a stack of the PC register 28 is saved in the RAM 18 (step S40). Thereafter, a control signal is transmitted from the exception processing sequential control unit 43 to the exception processing generating source 16 through a control line L4, a program address of a normal instruction such as a jump instruction is loaded from the exception processing generating source 16 to the data pass section 14 through the data bus 13 (step S50), and the program address of the normal instruction is set in the PC register 28 (step S60). The steps S10 to S60 are executed under the control of the exception processing sequential control unit 43.

Thereafter, the operation of the exception processing sequential control unit 43 is finished, and the operation of the normal processing sequential control unit 21 is started to process the normal instruction. In this embodiment, the jump instruction is read out from the ROM 20 according to the program address of the normal instruction and is set to the PC register 28, a processing based on the jump instruction is executed. That is, a normal instruction control signal is transmitted from the normal processing sequential control unit 21 to the decoding unit 23 through the control line L3, a control signal is transmitted from the decoding unit 23 to the ALU 24 through the control bus L1, a particular address at which an exception processing vector is stored in the ROM 20 is calculated in the ALU 24 (step S70), the exception processing vector is loaded from the ROM 20 according to the particular address of the exception processing vector (step S80), the exception processing vector is set in the PC register 28 (step S90), and an operational state of the microprocessor 41 is branched to an exception processing routine (step S100).

In this case, a branch address is indicated by a data value stored at an address of the ROM 20 which is indicated by a value of the exception processing vector.

Figure 9:
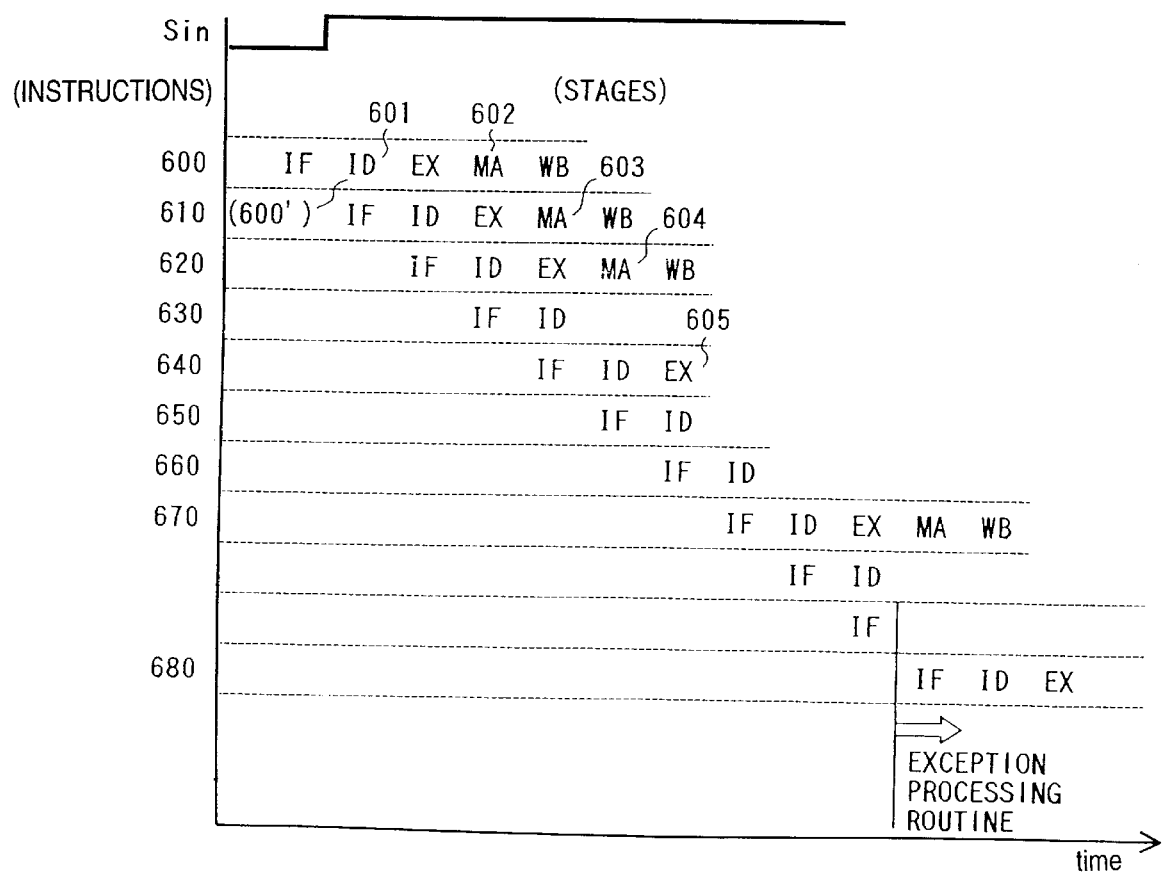
FIG. 9 shows a stream of pipeline processing performed in the information processing apparatus shown in FIG. 7 according to the memory indirect addressing technique when an interruption for an exception processing occurs.

The above state transition of the micro processor 41 is indicated by a stream of a pipeline processing shown in FIG. 9.

As shown in FIG. 9, when an interruption signal Sin is input from the exception processing generating source 16 to the exception processing sequential control unit 43 in an ID stage 601 in which an instruction 600 is executed, the instruction 600 is discarded, and the operation of the exception processing sequential control unit 43 is started to start an exception processing sequential procedure. That is, a first instruction 600' is output from the exception processing sequential control unit 43, a memory address for saving the PSR 29 is calculated in an EX stage of the instruction 600, and a program state of the interrupted program registered in a stack of the PSR 29 takes is saved in the RAM 18 in an MA stage 602 of the instruction 600. Also, a memory address for saving the PC 28 is calculated in an EX stage of a second instruction 610 output from the exception processing sequential control unit 43 in synchronization with the MA stage 602 of the instruction 600, and contents of a stack of the PC register 28 is saved in the RAM 18 in an MA stage 603 of the second instruction 610. Also, a third instruction 620 is output from the exception processing sequential control unit 43, a program address of a jump instruction is calculated in an EX stage of the third instruction 620 in synchronization with the MA stage 603 of the second instruction 610, and the program address of the jump instruction is transmitted from the ROM 20 in an MA stage 604 of the third instruction 620. Also, a fourth instruction 630 is output from the exception processing sequential control unit 43, an ID stage is performed in synchronization with the EX stage of the third instruction 620 after an IF stage is performed, and any EX, MA or WB stage is not performed. Thereafter, an ID stage of a fifth instruction 640 output from the exception processing sequential control unit 43 is performed in synchronization with the MA stage of the third instruction 620, and the program address of the jump instruction is set in the PC register 28 in an EX stage 605 of the fifth instruction 640. Therefore, the MA stage 602, the MA stage 603, the MA stage 604, the EX stage 605 are performed in that order. Also, a sixth instruction 650 is output from the exception processing sequential control unit 43, an ID stage is performed in synchronization with the EX stage 605 of the fifth instruction 640 after an IF stage is performed, and any EX, MA or WB stage is not performed. Also, a seventh instruction 660 is output from the exception processing sequential control unit 43, IF and ID stages are performed, and any EX, MA or WB stage is not performed.

Thereafter, the operation of the exception processing sequential control unit 43 is stopped, and the operation of the normal processing sequential control unit 21 is started. That is, the jump instruction is executed when an instruction 670 is output from the normal processing sequential control unit 21, an offset value of a program address at which a branch address (or an exception processing starting address) of a top program used for an exception processing routine is stored in the ROM 20 is loaded from the exception processing generating source 16 to the normal processing sequential control unit 21, a program address (or the branch address) of the exception processing routine is calculated from the offset value and a base address, and the calculated program address is set in the PC register 28. Thereafter, the operation of the normal processing sequential control unit 21 is stopped, and the operation of the exceptional processing sequential control unit 43 is started, and the exception processing routine is started when an instruction 680 is output from the exceptional processing sequential control unit 43.

Accordingly, because the setting of the branch address is performed by the normal processing sequential control unit 21, an exception processing sequence can be made up by using the seven instructions 600', 610, - - -, 650 and 660. In contrast, in the prior art, an exception processing sequence is made up by using the nine instructions 400', 410, - - -, 470 and 480. Therefore, the exceptional processing sequential control unit 43 operated according to the memory indirect addressing technique can be downsized because the number of instructions required for the exception processing sequence can be made small.

In this embodiment, the information processing apparatus (or the microprocessor) operated according to the pipeline method is described. However, even though the information processing apparatus is not operated according to the pipeline method but operated according to another method, the information processing apparatus can be downsized in the same manner.

Next, a second embodiment is described.

Figure 10:
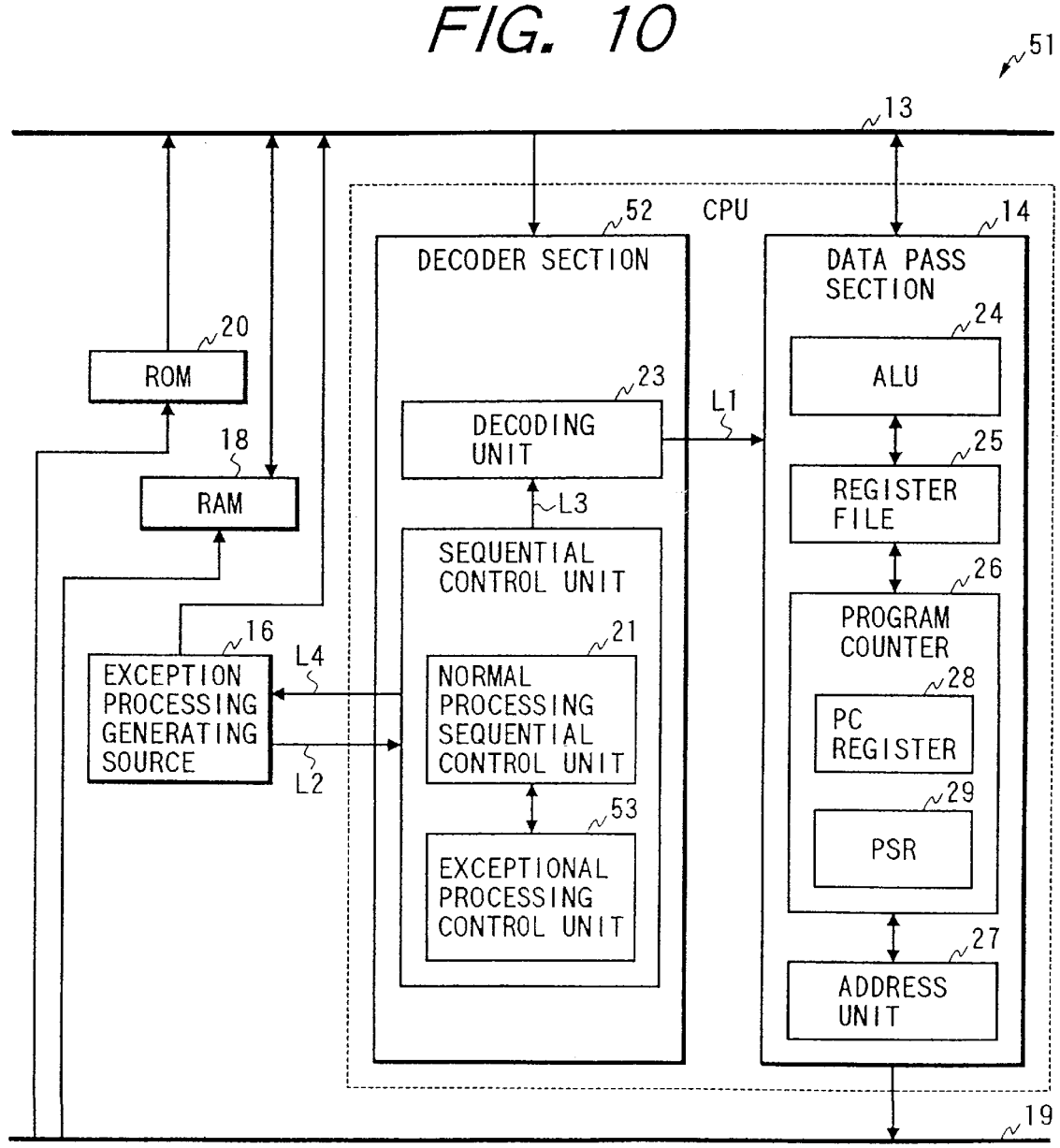
FIG. 10 is a block diagram of an information processing apparatus (or a microprocessor) according to a second embodiment of the present invention.

FIG. 10 is a block diagram of an information processing apparatus (or a microprocessor) operated according to a memory direct addressing technique according to a second embodiment of the present invention.

As shown in FIG. 10, a micro processor 51 comprises the exception processing generating source 16, the RAM 18, the ROM 20, the data pass section 14 and a decoder section 52 for reading an instruction transmitted from the ROM 20 through the data bus 13 and decoding the instruction.

The decoder section 52 comprises a normal processing sequential control unit 21, an exception processing sequential control unit 53 for controlling an exception processing routine performed according to an exception processing program stored in the ROM 20 in cases where the interruption occurring signal generated in the exception processing generating source 16 is received, and the decoding unit 23.

Figure 11:
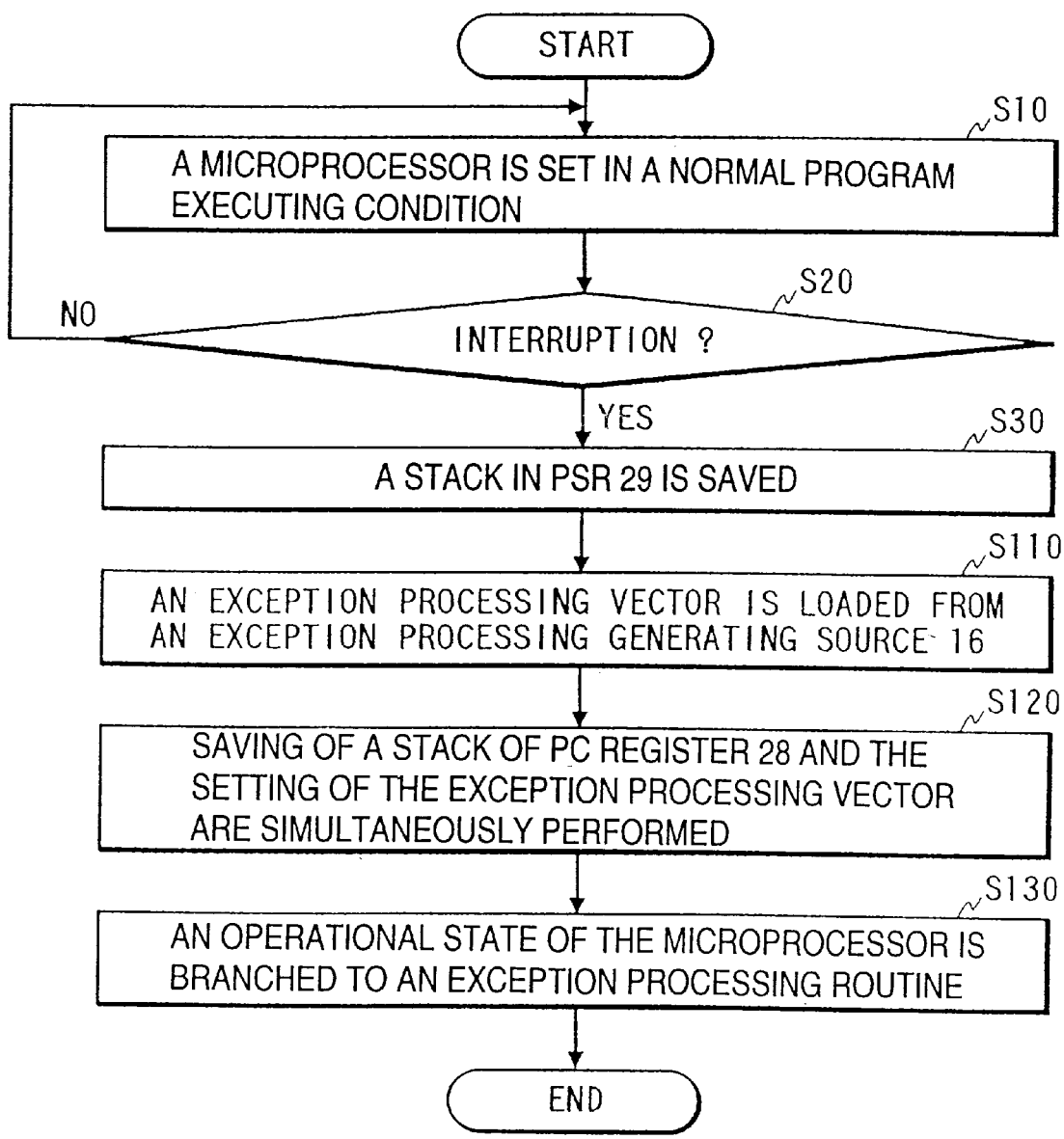
FIG. 11 is a flow chart showing a state transition of the information processing apparatus shown in FIG. 10 from a normal processing state to an exception processing state according to the memory direct addressing technique.

In the above configuration of the microprocessor 51, an interruption response to an exception processing state is described with reference to FIG. 11.

When the microprocessor 51 is set in a normal program executing condition to execute a particular normal program (step S10), it is judged whether or not an interruption to the particular normal program occurs (step S20). In cases where an interruption occurs, an interruption occurring signal indicating the occurrence of the interruption is transmitted from the exception processing generating source 16 to the exception processing sequential control unit 53, and the operation of the exception processing sequential control unit 53 is started. Therefore, a program state of the interrupted program registered in a stack of the PSR 29 initially is saved in the RAM 18 (step S30). Thereafter, a control signal is transmitted from the exception processing sequential control unit 53 to the exception processing generating source 16 through the control line L4, an exception processing vector is loaded from the exception processing generating source 16 (step S110), saving of contents of a stack of the PC register 28 to memory and the setting of the exception processing vector to the program counter 28 are simultaneously performed (step S120), and an operational state of the microprocessor 51 is branched to an exception processing routine (step S130).

Figure 12:
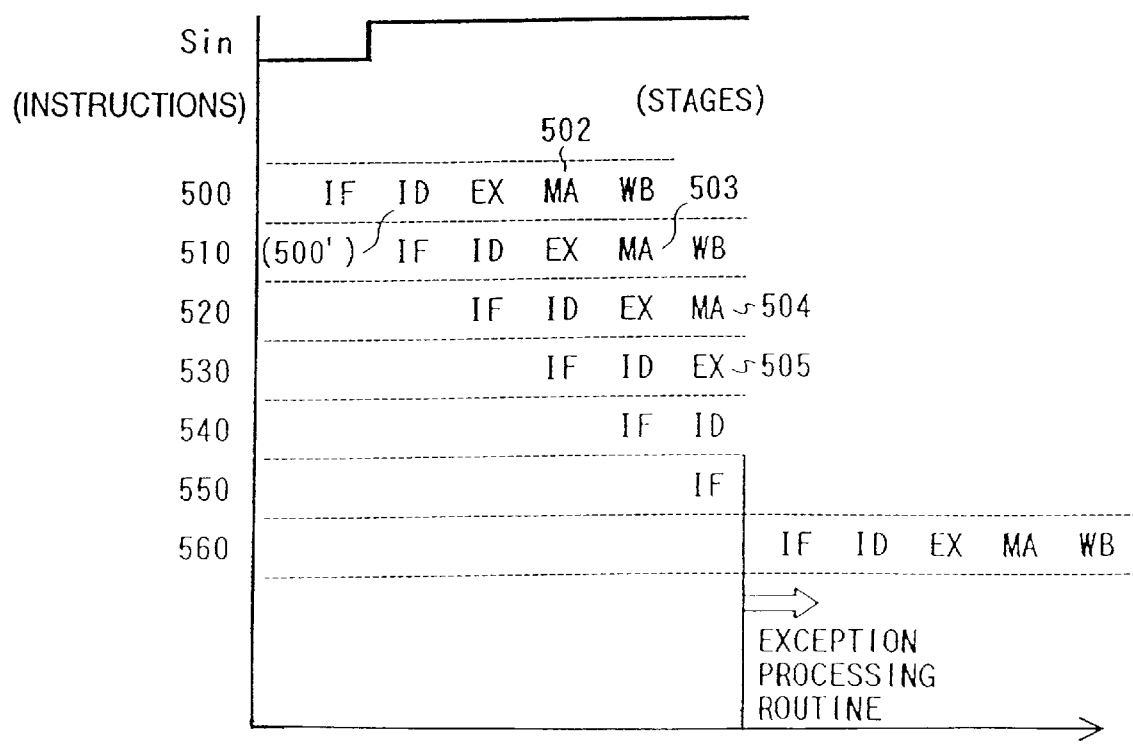
FIG. 12 shows a stream of pipeline processing performed in the information processing apparatus shown in FIG. 11 according to the memory direct addressing technique when an interruption for an exception processing occurs.

The above interruption response to the exception processing state is indicated by a stream of a pipeline processing shown in FIG. 12.

As shown in FIG. 12, when an interruption signal Sin is input from the exception processing generating source 16 to the exception processing sequential control unit 53 in an ID stage 501 in which an instruction 500 is executed, the instruction 500 is discarded, and the operation of the exception processing sequential control unit 53 is started to start an exception processing sequential procedure. That is, a first instruction 500' is output from the exception processing sequential control unit 53, a memory address for saving the PSR 29 is calculated in an EX stage of the instruction 500, and a program state of the interrupted program registered in a stack of the PSR 29 is saved in the RAM 18 in an MA stage 502 of the instruction 500. Also, a branch address is calculated in an EX stage of the second instruction 510 in synchronization with the MA stage 502, and the branch address is loaded from the exception processing generating source 16 to the data pass unit 14 through the data bus 13 in an MA stage 503 of the second instruction 510. Also, a third instruction 520 is output from the exception processing sequential control unit 53, contents of a stack of the PC register 28 is saved in the RAM 18 in an MA stage 504 of the third instruction 520. Also, a fourth instruction 530 is output from the exception processing sequential control unit 53, the branch address is set in the PC register 28 in an EX stage 505 of the fourth instruction 530 in synchronization with the MA stage 504. Also, a fifth instruction 540 is output from the exception processing sequential control unit 53, IF and ID stages are performed, and any EX, MA or WB stage is not performed. Also, a sixth instruction 550 is output from the exception processing sequential control unit 53, an IF stage is performed, and any ID, EX, MA or WB stage is not performed. Thereafter, an instruction 560 is output from the exception processing sequential control unit 53, and an exception processing routine is started. In this case, an interruption response is 6 cycles of the instructions 500', 510, - - - , 540 and 550.

Therefore, an exception processing sequence can be made up of saving of a program condition (the MA stage 502), loading of the branch address (the MA stage 503), saving of the program counter (the MA stage 504) and setting of the branch address (the EX stage 505).

Accordingly, because a type of delay branching is performed and a stage is not required to set the branch address loaded from the exception processing generating source 16 to the PC register 28, the number of instructions required for the interruption response is reduced to 6 as compared with 7 instructions 300', 310, - - - , 350 and 360 in the prior art, so that an amount of time for the interruption response can be shortened.

Also, because the number of instructions required for the interruption response is reduced, the exceptional processing sequential control unit 53 operated according to the memory direct addressing technique can be downsized.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An exception processing method performed in a pipeline processing according to a specific order, the specific order being an instruction reading operation, an instruction decoding operation, an arithmetic operation, a memory accessing operation and a write-back operation, according to a memory indirect addressing technique, the exception processing method comprising:

detecting an occurrence of an interruption for an exception processing in an exception processing sequential control unit;

reading out, in a single reading operation, a normal instruction from a storing unit during the instruction reading operation under control of the exception processing sequential control unit, the normal instruction not being executed in the exception processing, but being executed in a normal processing;

setting the normal instruction in a program counter under the control of the exception processing sequential control unit;

transmitting a normal instruction control signal from a normal processing sequential control unit to a decoding unit;

transmitting a control signal from the decoding unit to an arithmetic logic unit under control of the normal processing sequential control unit;

calculating in the arithmetic logic unit, a particular address at which an exception processing vector is stored in a memory, a branch address of an exception processing routine being indicated by a data value stored at a specific address of the memory, which is indicated by a value of the exception processing vector;

reading out the exception processing vector from the memory according to the particular address under the control of the normal processing sequential control unit;

setting the exception processing vector in the program counter under the control of the normal processing sequential control unit; and setting the branch address of the exception processing routine, indicated by the exception processing vector, in the program counter according to the normal instruction during the normal processing under the control of the normal processing sequential control unit.

2. An exception processing method according to claim 1 in which the detecting of the occurrence of the interruption includes:

transmitting an address of a currently used normal program to a memory; and transmitting a program state of the currently used normal program to the memory, wherein the step of setting the branch address comprises:
executing the normal instruction;
loading a value of a reference address at which the branch address is stored or an address offset value according to the normal instruction;
setting the branch address in the program counter according to the reference address or a set of the address offset and a base address; and
starting the exception processing routine under the control of the exception processing sequential control unit.

3. An exception processing method according to claim 1 in which the normal instruction is a jump instruction.

4. An exception processing method according to claim 2 in which the normal instruction is a jump instruction.

5. An exception processing apparatus operated in a pipeline processing according to a specific order, the specific order being an instruction reading operation, an instruction decoding operation, an arithmetic operation, a memory accessing operation and a write-back operation, according to a memory indirect addressing technique, the exception processing apparatus comprising:

exception processing generating means for generating an occurrence of an interruption for an exception processing;

storing means for storing an exception processing vector, which indicates a branch address of an exception processing routine, and storing a normal instruction, the normal instruction not being executed in the exception processing, but being executed in a normal processing;

exception processing sequential control means for detecting the occurrence of the interruption generated by the exception processing generating means, reading out, in a single reading operation, the normal instruction from the storing means during the instruction reading operation, controlling a setting of the normal instruction and controlling an execution of the exception processing routine;

decoding means for decoding a normal instruction control signal;

calculating means for calculating a particular address, at which the exception processing vector is stored in the storing means, according to a control signal output from the decoding means;

registering means for registering the normal instruction under the control of the exception processing sequential control means, registering the exception processing vector read out from the storing means according to the particular address calculated by the calculating means and registering the branch address of the exception processing routine indicated by the exception processing vector; and normal processing sequential control means for transmitting the normal instruction control signal to the decoding means, and controlling, during the normal processing, the decoding means to transmit a control signal to the calculating means, controlling the calculating means to calculate the particular address, and controlling the registering means to read out the exception processing vector from the memory according to the particular address, to set the exception processing vector in the registering means and to set the branch address of the exception processing routine indicated by the exception processing vector in the registering means according to the normal instruction.

6. An exception processing method according to a memory direct addressing technique, comprising:

dividing an operational function performed according to each of a plurality of instructions into a plurality of stages;

executing the plurality of instructions in parallel to each other according to a pipeline processing by simultaneously performing one stage of one instruction and one stage of another instruction;

detecting an occurrence of an interruption for an exception processing in an exception processing sequential control unit;

transmitting a program state of a currently used normal program to a memory according to a first instruction under control of the exception processing sequential control unit;

transmitting an address of the normal program to the memory according to a second instruction under the control of the exception processing sequential control unit;

loading a branch address of an exception processing routine according to a third instruction under the control of the exception processing sequential control unit before the address of the normal program or the program state of the normal program is transmitted to the memory; and setting the loaded branch address in a program counter according to a fourth instruction under the control of the exception processing sequential control unit in synchronization with the transmission of the address of the normal program or the transmission of the program state of the normal program.

7. An exception processing method according to claim 6 wherein:

the transmitting of the program state of the normal program is performed in a memory access stage of the first instruction;

the loading of the branch address of the exception processing routine is performed in a memory access stage of the third instruction after the memory access stage of the first instruction, the transmitting of the address of the normal program is performed in a memory access stage of the second instruction after the memory access stage of the third instruction, and the setting of the loaded branch address is performed in synchronization with the transmission of the address of the normal program.

8. An exception processing apparatus operated according to a memory direct addressing technique, comprising:

exception processing generating means for generating an occurrence of an interruption for an exception processing;

exception processing sequential control means for first detecting the occurrence of the interruption generated by the exception processing generating means, second, performing a first control to transmit a program state of a currently used normal program third, performing a second control to load a branch address of an exception processing routine and fourth, performing a third control to transmit an address of the normal program and for controlling a setting of the loaded branch address in a program counter in synchronization with the transmission of the address of the normal program;

a memory for storing the program state of the normal program and the address of the normal program transmitted under the control of the exception processing sequential control means; and a program counter for setting the loaded branch address under the control of the exception processing sequential control means.

9. An exception processing apparatus operated in a pipeline processing according to a specific order, the specific order being an instruction reading operation, an instruction decoding operation, an arithmetic operation, a memory accessing operation and a write-back operation, according to a memory indirect addressing technique, the exception processing apparatus comprising:

an exception processing generating source constructed and arranged to generate an occurrence of an interruption for an exception processing;

a storing unit constructed and arranged to store an exception processing vector, which indicates a branch address of an exception processing routine, and to store a normal instruction, the normal instruction not being executed in the exception processing, but being executed in a normal processing;

an exception processing sequential control unit constructed and arranged to detect the occurrence of the interruption generated by the exception processing generating source, to read out, in a single reading operation, the normal instruction from the storing unit during the instruction reading operation, to control a setting of the normal instruction and to control an execution of the exception processing routine;

a decoding unit arranged to decode a normal instruction control signal;

an arithmetic logic unit arranged to calculate a particular address, at which the exception processing vector is to be stored, according to a control signal output from the decoding unit;

a registering unit constructed and arranged to register the normal instruction under the control of the exception processing sequential control unit, to register the exception processing vector read out from the storing unit according to the particular address calculated by the arithmetic logic unit and to register the branch address of the exception processing routine indicated by the exception processing vector; and a normal processing sequential control unit constructed and arranged to transmit the normal instruction control signal to the decoding unit, and to control during the normal processing, the decoding unit to transmit the control signal, to control the arithmetic logic unit to calculate the particular address, and to control the registering unit to read out the exception processing vector from the memory according to the particular address, to set the exception processing vector in the registering unit and to set the branch address of the exception processing routine indicated by the exception processing vector in the registering unit according to the normal instruction.

10. An exception processing apparatus operated according to a memory direct addressing technique, comprising:

an exception processing generating source constructed and arranged to generate an occurrence of an interruption for an exception processing;

an exception processing sequential control unit constructed and arranged to first detect the occurrence of the interruption generated by the exception processing generating source, second, perform a first control to transmit a program state of a currently used normal program, third, perform a second control to load a branch address of an exception processing routine and fourth, perform a third control to transmit an address of the normal program and for controlling the a setting of the loaded branch address in a program counter in synchronization with the transmission of the address of the normal program;

a memory for storing the program state of the normal program and the address of the normal program transmitted under the control of the exception processing sequential control unit; and a program counter for setting the loaded branch address under the control of the exception processing sequential control unit.

* * * * *